(No Model.)
W. J. WIGG.
MANUFACTURE OF VENETIAN RED.
No. 464,917. Patented Dec. 8, 1891.
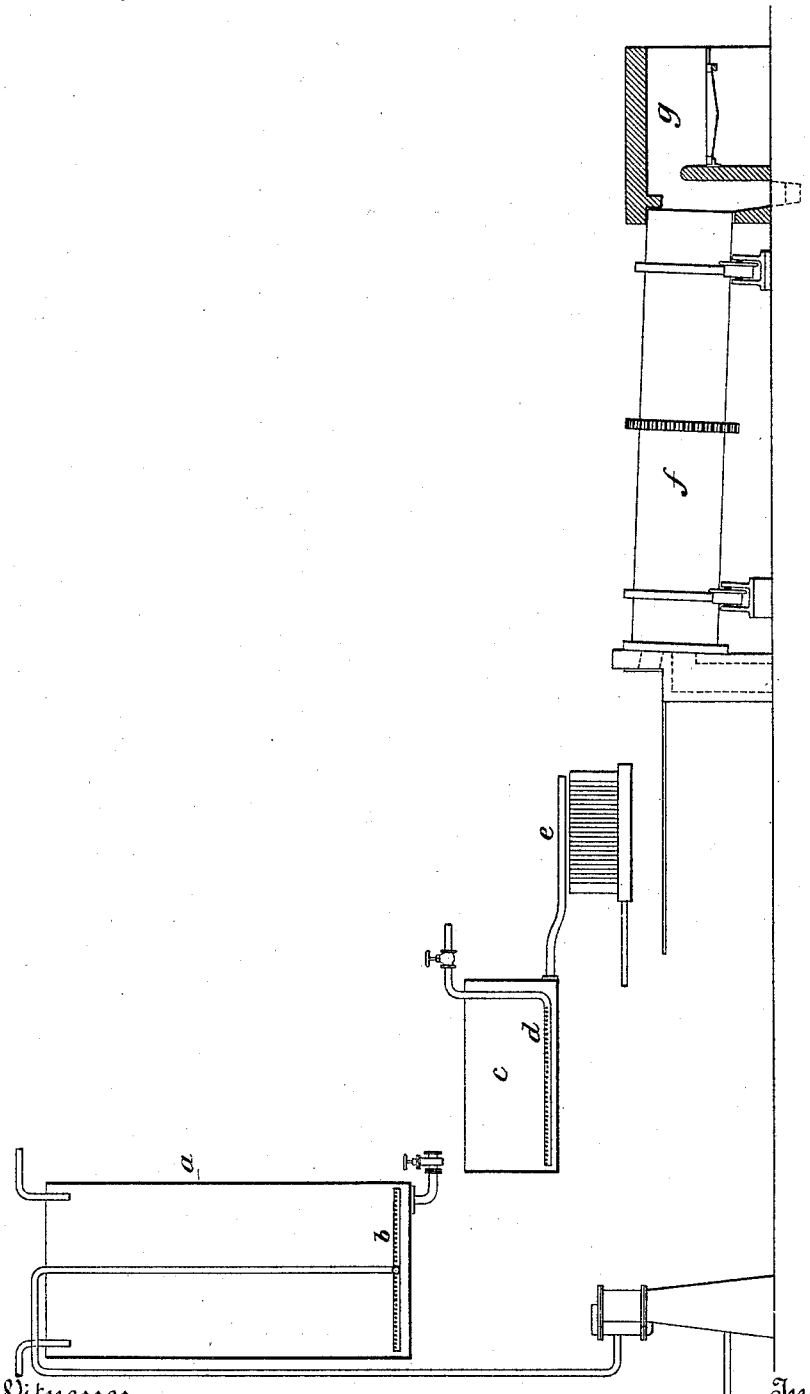
Witnesses
C. E. Ashley
S. F. Macpeak
Inventor
Walter John Wigg
By his Attorneys
Mtter & Kenyon

UNITED STATES PATENT OFFICE.

WALTER JOHN WIGG, OF FRODSHAM, ASSIGNOR TO THE HULL AND LIVERPOOL RED OXIDE COMPANY, LIMITED, OF KINGSTON-UPON-HULL, ENGLAND.

MANUFACTURE OF VENETIAN RED.

SPECIFICATION forming part of Letters Patent No. 464,917, dated December 8, 1891.

Application filed May 7, 1891. Serial No. 391,853. (No specimens.)

*To all whom it may concern:*

Be it known that I, WALTER JOHN WIGG, a subject of the Queen of Great Britain, residing at Frodsham, in the county of Chester, England, have invented a certain new and useful Improvement in the Manufacture of Venetian Red; and I do hereby declare the following to be a clear and exact description thereof, reference being had to the accompanying drawings, which form a part hereof.

Hitherto when it has been desired to obtain Venetian red the coloring oxides of iron have been first produced or obtained in any suitable way (as, for instance, by the process of Letters Patent No. 370,511, granted September 27, 1887, to Wigg, Steele and Wigg) and have then been mechanically mixed in a dry powdery state with powdered barytes, gypsum, or the like body-forming agents, (as, for instance, by the process of the Peterson patent, No. 203,936, dated May 21, 1878.) In effecting this mechanical admixture expense and time are involved, and in the end, even at the best, the two ingredients—the coloring agent and the body-forming agent—that is, the color-reducing agent—are in separate particles of greater or less size and irregularity intermingled and the quality of the color is irregular and inferior.

The object of my invention is to obviate the above disadvantages and to obtain cheaply and directly and in one operation Venetian red of good color and body; and it consists in the processes herein described and claimed.

In carrying out my invention I preferably begin with the residual copper-liquor obtained in the precipitation of copper by the wet process, although any liquor will answer which contains in solution a sufficient proportion of a salt of iron to make it worth while treating it, and which contains also in solution (in the same or in a different salt) a suitable proportion of a substance which will on the admixture of the reagent employed form with that reagent or with its base an insoluble salt or substance suitable for a body-forming or color-reducing substance. The residual copper-liquor referred to and preferred may be generally stated as containing in solution about ten per cent. of chloride of iron and sixteen per cent. of sulphate of soda, the substances specially operative in my process, and with them three per cent. of chloride of sodium, traces of other salts, and seventy-one per cent. of water, though said proportions will of course vary considerably. This liquor thus containing soluble iron and a suitable proportion of another suitable soluble substance, as described, I treat with a large excess of milk of lime, milk of magnesia, or the like suitable oxide, this reagent being in sufficient excess to accomplish the following results—namely, approximately all the iron of the soluble salt of iron in the liquor becomes more or less oxidized and insoluble, and substantially all the other soluble salt or substance of the liquor unites with the reagent or with its base, forming, also, an insoluble salt in quantity in excess of the insoluble oxide of iron produced, the whole compound precipitate being of a greenish color. The relative proportions of the residual copper or other liquor and the milk of lime that I find satisfactory in practice are about six hundred weight of the lime to such a quantity of the residual copper or other liquor employed as will produce about a ton of Venetian red. Care must be taken to employ much more of the milk of lime than would simply be an equivalent of lime for the purpose of precipitating the iron, as an oxide for the other soluble salt or substance of the liquor appropriates and requires more of the reagent even than does the iron. The mixture is preferably kept agitated for several hours, and preferably with the first beginning of the mixing I begin to oxidize the product by forcing air or other oxidizing gas or agent through the mixture. This is kept up for several hours, and it acts both to thoroughly agitate and intermingle the green-colored mixture and also to further oxidize it, causing it to gradually assume a yellow or yellowish-red color. This air-oxidizing step is preferably followed and supplemented by a steam oxidizing and cleansing step, or the precipitate, after the mother-liquor is drawn off, is washed with water, or both steam and water are used. Then the washed precipitate is preferably filtered in filter-presses, and then it is in all cases furnaced in the usual way.

I show in the drawings apparatus well adapted to carry out my new process in its preferred form, and I will now proceed to describe that preferred process more in detail in connection with the said drawings.

$a$ is the mixing and oxidizing vessel. It may be built, for instance, some thirty feet in height and ten or twelve feet in diameter, and is preferably cylindrical. Into this mixing and oxidizing chamber is pumped the residual copper-liquor or other liquor employed, and at the same time and at a proper relative rate is pumped the milk of lime, this through pipes shown in the drawings. When the mixture has attained a depth of three or four feet in the vessel $a$, air is turned on through the pipe $b$ and is forced up out of the perforated arms of the pipe $b$ at the bottom of the vessel $a$ through the mixture. Thus is kept up a violent and continuous agitation of the liquid contents of the vessel $a$. It will ordinarily take an hour or two to fill the tank $a$ with the copper-liquor and the milk of lime or other reagent employed. During all this time the blast of air has been kept up, and it is preferably kept up for some two hours or more after the vessel $a$ is full. Owing to the continuous violent agitation of the liquid, the vessel $a$ should not be filled to the top. The time of shutting off the air-blast is determined, however, by the condition and color of the mixed liquor, the air-blast being continued until the whole of the precipitate is of a yellowish-red color. The milk of lime is preferably shut off when a small amount of the dissolved iron is still unprecipitated. The mixture, which has now somewhat of a yellow or yellowish-red color, is allowed to run out into the steam washing and oxidizing vessel $c$, where it is submitted to the action of steam introduced through the pipe $d$, which has perforations at the bottom of the vessel, as shown. From this vessel $c$ the mother-liquor is drawn off, the insoluble ingredients of the mixture being allowed to settle to the bottom of the vessel. Pure water also is introduced from time to time and drawn off, the insoluble precipitate being thereby and by the action of the steam cleansed from soluble ingredients. The steam also operates upon the precipitate apparently to further oxidize it and the color is slightly deepened.

The apparatus $e$ represents, diagrammatically, an ordinary filter-press, where the large excess of moisture is squeezed out from the precipitate, and from which the precipitate in cakes is introduced into the revolving cylindrical furnace $f$. This furnace revolves about once in four minutes. The precipitate is being continuously introduced at the upper end, and the furnaced product, now a brilliant red, is continuously delivered at the lower and opposite end of the furnace. The heat is derived from the fire-place $g$, the products of combustion from which pass through the furnace $f$ in contact with the precipitate and out through a suitable vent at the other end of the furnace. Air is introduced into and above the fire $g$, so that the character and quality of the flame in the furnace $f$ is readily controllable. Ordinarily the furnacing consumes about an hour from the time a given mass of material enters the furnace until it leaves it. The parts are preferably arranged, as shown in the drawings, one above the other, so that the treated material can be passed by gravitation from one vessel to another, or, when necessary, pumps and elevators may be used to raise the materials from one vessel to another.

It will be observed that by my improved process the combination of the color-producing oxide of iron with the body-forming or color-reducing substance (which combination constitutes the Venetian red, the ultimate product sought) is effected not mechanically as a mere mechanical admixture of dry powdered materials, but is effected primarily and, as it were, chemically, the two substances being precipitated simultaneously from the same solution; and it will also be observed that the thing subjected to the furnacing step of the process is not the color-producing substance, (the oxide of iron), but it is the combination substance, consisting of the color-producing material and in greater excess the body-forming or color-reducing material. The Venetian red produced by my process is therefore superior to that heretofore produced or possible to be produced.

I do not herein claim the apparatus, as I claim that in an application made simultaneously herewith.

What I claim as new, and desire to secure by Letters Patent, is—

1. The process of producing Venetian red, which consists in treating a proper solution of iron and of a body-producing substance with milk of lime or equivalent reagent and furnacing the precipitate, substantially as and for the purpose described.

2. The process of producing Venetian red, which consists in treating a proper solution of iron and of a body-producing substance with milk of lime or equivalent reagent, oxidizing the mixture, and then furnacing the precipitate, substantially as and for the purposes described.

3. The process of producing Venetian red, which consists in treating residual copper-liquor (obtained in the precipitation of copper by the wet process) with an excess of milk of lime or equivalent reagent, oxidizing the mixture, and then furnacing the precipitate, substantially as and for the purposes described.

4. The process of producing Venetian red, which consists in treating a proper solution of iron and of a body-producing substance with milk of lime or equivalent reagent, agitating and oxidizing the mixture by blowing air or other oxidizing gas or agent through it, further oxidizing and cleansing the precipitate by steam and water, and then furnacing the precipitate, substantially as and for the purposes set forth.

WALTER JOHN WIGG.

Witnesses:
 ORISON B. SMITH,
 WILLIAM H. KENYON.